(12) United States Patent
Sharifi

(10) Patent No.: US 9,674,497 B1
(45) Date of Patent: *Jun. 6, 2017

(54) EDITING MEDIA CONTENT WITHOUT TRANSCODING

(71) Applicant: Google Inc., Mountain View, CA (US)

(72) Inventor: Matthew Sharifi, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 250 days.

This patent is subject to a terminal disclaimer.

(21) Appl. No.: 13/925,363

(22) Filed: Jun. 24, 2013

Related U.S. Application Data

(63) Continuation of application No. 13/362,725, filed on Jan. 31, 2012, now Pat. No. 8,488,943.

(51) Int. Cl.
*H04N 9/87* (2006.01)

(52) U.S. Cl.
CPC ..................... *H04N 9/87* (2013.01)

(58) Field of Classification Search
CPC .......... H04N 9/87; H04N 9/8042; H04N 5/94; H04N 9/885
USPC ........................................ 386/283, 270, E95
See application file for complete search history.

(56) References Cited

U.S. PATENT DOCUMENTS

| 6,707,778 | B1* | 3/2004 | Lin ........................ G06T 9/007 369/83 |
| 7,860,872 | B2 | 12/2010 | Serjeantson et al. |
| 7,865,833 | B2 | 1/2011 | Takaku et al. |
| 7,869,892 | B2 | 1/2011 | Foust et al. |
| 7,921,221 | B2 | 4/2011 | Minborg et al. |
| 2003/0061369 | A1* | 3/2003 | Aksu et al. ..................... 709/231 |
| 2006/0013564 | A1* | 1/2006 | Hamada ............... G11B 27/034 386/248 |
| 2007/0300296 | A1 | 12/2007 | Kudla et al. |
| 2008/0072261 | A1* | 3/2008 | Ralston et al. ................. 725/62 |
| 2010/0328326 | A1* | 12/2010 | Hervas et al. ................ 345/522 |
| 2011/0058792 | A1* | 3/2011 | Towner et al. ............... 386/326 |
| 2011/0167337 | A1* | 7/2011 | Paley et al. ................... 715/252 |
| 2012/0020639 | A1* | 1/2012 | Hirono et al. ................ 386/227 |
| 2012/0233434 | A1 | 9/2012 | Starks et al. |

OTHER PUBLICATIONS

Introduction to Video Coding, http://people.xiph.org/~tterribe/pubs/lca2012/auckland/intro_to_video1.pdf, Last accessed Apr. 12, 2012.
Notice of Allowance for U.S. Appl. No. 13/362,725, dated Mar. 19, 2013, 25 pages.

\* cited by examiner

*Primary Examiner* — Thai Tran
*Assistant Examiner* — Nien-Ru Yang
(74) *Attorney, Agent, or Firm* — Fenwick & West LLP

(57) ABSTRACT

Systems and methods for editing an MP4 multimedia container without transcoding are disclosed herein. Editing operations can be accomplished by transforming data included in the multimedia container rather than by transforming raw data streams and then reconverting to MP4 (or another) file format. In response to a target range that identifies a portion of the media content to maintain, a corresponding sample range in terms of the MP4 format can be constructed and data outside that range can be discarded, e.g., from the mdat atom and the sample tables atom(s).

16 Claims, 11 Drawing Sheets

EDITING MEDIA CONTENT WITHOUT TRANSCODING

CROSS REFERENCE TO RELATED APPLICATION

This application is a continuation of U.S. patent application Ser. No. 13/362,725, filed Jan. 31, 2012, and entitled "TRIMMING MEDIA CONTENT WITHOUT TRANSCODING". The entirety of the above-referenced application is hereby incorporated by reference.

TECHNICAL FIELD

This disclosure generally relates to time-based trimming or cropping of media content without re-encoding or transcoding the media content.

BACKGROUND

Recording devices that allow a user to capture videos or other audio-visual media content into a digitally encoded format are becoming increasingly widespread. Today, a user can record a video with a smart phone or other device and upload that video to a content hosting website within moments. However, in some cases the user would like to edit the video prior to uploading to the hosting website, such as trimming portions of the video.

While many different encoding formats exist, most smart phones encode video captures according to the MP4 (Motion Pictures Expert Group 4 Part 14) file format, which is a complex format including many hierarchical sample tables and other atoms. As a result, in order to trim (or otherwise edit) data from a video encoded in the MP4 file format, conventional systems will first employ transcoding. Transcoding involves initially parsing the MP4 file and decoding both the audio and video frames to which trimming or other edits on the actual data streams (audio or video) are performed, and then re-encoding and multiplexing those data streams back into MP4 format or into a different file format.

Thus, employing transcoding in order to edit media content is a resource-intensive process that will generally reduce the quality of the media content given the use of lossy compression codecs that are commonplace for audio-visual media content. Furthermore, employing transcoding requires that the editing tool performing the transcoding be equipped with all the necessary codecs. Because some codecs require a licensing/royalty fee, such editing tools can be expensive to distribute. Accordingly, even though many consumer devices provide the capability to capture and upload video, such devices rarely include editing tools to enable a user to modify the video prior to upload. Thus, users who desire to edit their videos prior to upload are typically forced to transfer the media content to other computing systems (e.g., a desktop computer) in order to perform the desired edits or simply upload the media content as-is.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its purpose is to present some concepts of the specification in a simplified form as a prelude to the more detailed description that is presented in this disclosure.

Systems and methods disclosed herein relate to editing (e.g., trimming) an MP4 multimedia container without transcoding. A container component can be configured to receive a multimedia container formatted according to the MP4 file format that describes media content. A timing component can be configured to receive a target range associated with the media content described by the multimedia container. The target range can include at least one of a start time and an end time for a target portion of the media content (e.g., a portion to be maintained). A parsing component can be configured to identify trim data (e.g., portion(s) to be removed or trimmed) included in the multimedia container that is not included in a sample range that corresponds to the target range. A cropping component can be configured to remove the trim data from the multimedia container, without decoding the media to provide a cropped container.

The following description and the drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
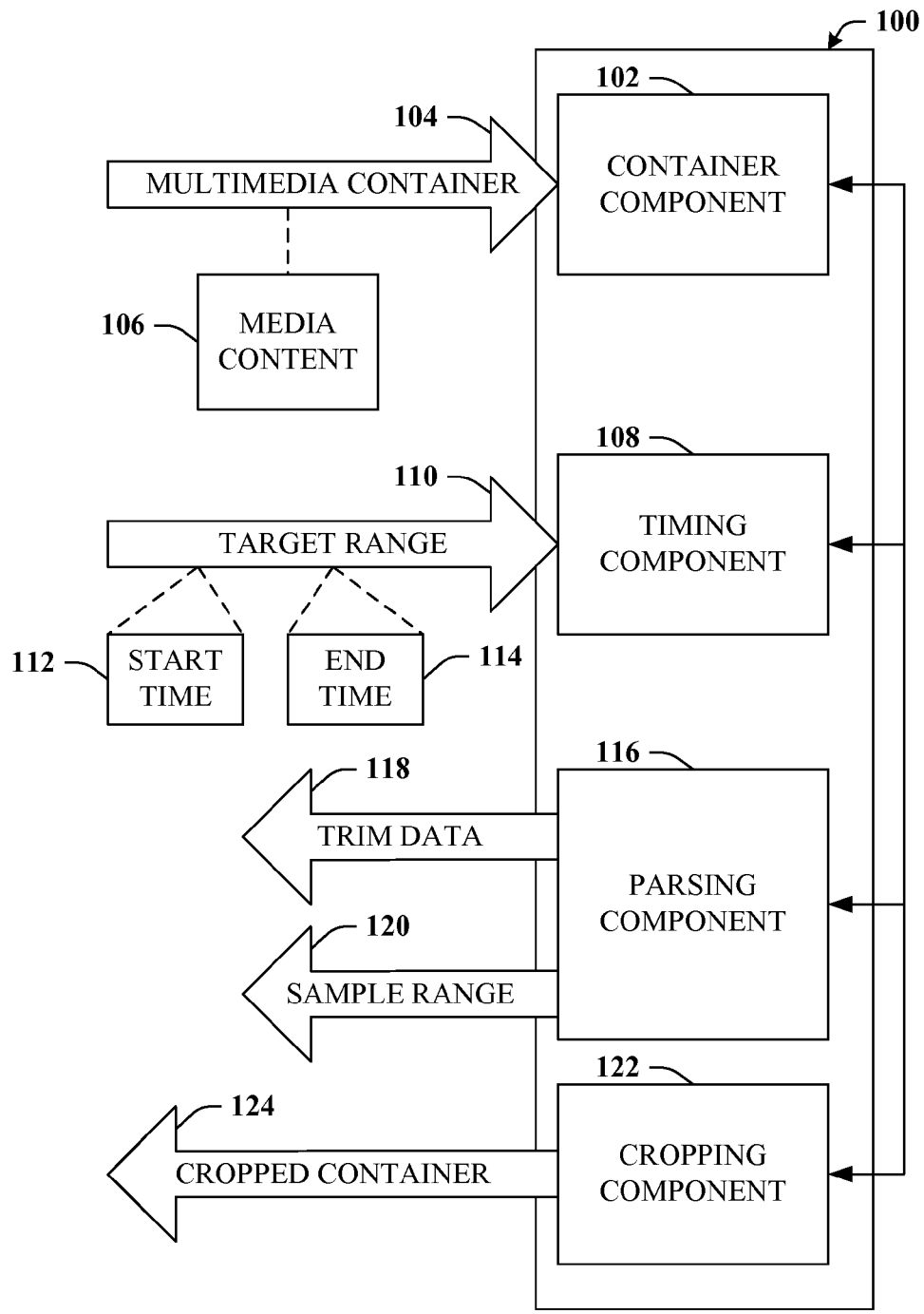
FIG. 1 illustrates a high-level block diagram of an example system that can edit media content without employing transcoding in accordance with certain embodiments of this disclosure.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

Systems and methods disclosed herein relate to editing, particularly trimming, media content without re-encoding or transcoding the media content. Because of some difficulties associated with transcoding, devices capable of capturing and uploading video in Motion Pictures Expert Group 4 Part 14 (MP4) file format typically do not provide a means to edit the video prior to upload. Although MP4 is a complicated file format, some edits can be accomplished without the use of transcoding. For example, media content can be trimmed (e.g., removing unwanted portions from the media content, generally at the beginning and/or the end), rotated, stitched, etc.

Performing such edits in connection with an MP4 multimedia container is not a trivial process as might otherwise be the case when editing the raw audio/video data streams. Yet, directly modifying the MP4 container can mitigate the need to re-encode the container, and therefore enable users to perform many useful edits (e.g., trimming) in a more convenient manner and further without degradation of the media content and without utilizing more expensive and resource-intensive tools.

As noted previously, many devices package captured audio and video in an MP4 container. Embodiments of this disclosure can provide a preview of the media content to enable a user to select a start time and an end time. Portions of the media content outside this target range can represent the data the user desires to trim. Generally, such input will be formatted in units of time, typically milliseconds, which can be converted to a timescale associated with each track (e.g., the audio track and the video track) in the MP4 container. This conversion can be accomplished by parsing the sample tables of each track of the MP4 container. Based upon this parsing, the start time can be matched to a sample start time for each track, the end time can be matched to a sample end time for each track, and the target range can therefore be matched to a sample range that is bounded by a sample start point and a sample end point for each track.

Upon determination of the sample range, data outside that range included in the MP4 container can be defined as trim data and removed from the container. The result after the trim data is removed is a cropped container that encodes a trimmed version of the media content, constructed without first re-encoding or transcoding. This trim includes portions of both 1) the raw audio and video data streams (included in an mdat atom of the MP4 container), and 2) sample tables atom data. Thus, the trimming of the MP4 container results in removing information from both the mdat atom and one or more sample table atoms for each track of the video. Moreover, because the size of the mdat atom has been changed, chunk offset information reflected in the sample table atoms can be updated as well as other relevant information such as track or video duration headers.

Example Trimming without Transcoding

Referring now to FIG. 1, a system 100 is depicted. System 100 can provide for editing media content without employing transcoding. System 100 can include a memory that stores computer executable components and a processor that executes computer executable components stored in the memory, examples of which can be found with reference to FIG. 10. In addition, system 100 can include a container component 102, a timing component 108, a parsing component 116, and a cropping component 122.

Container component 102 can be configured to receive multimedia container 104 formatted according to Motion Pictures Expert Group 4 Part 14 (MP4) file format, which is formally defined by ISO/IEC 14496-14:2003. The MP4 multimedia container 104 describes media content 106, typically media content captured by a recording device.

Figure 2:
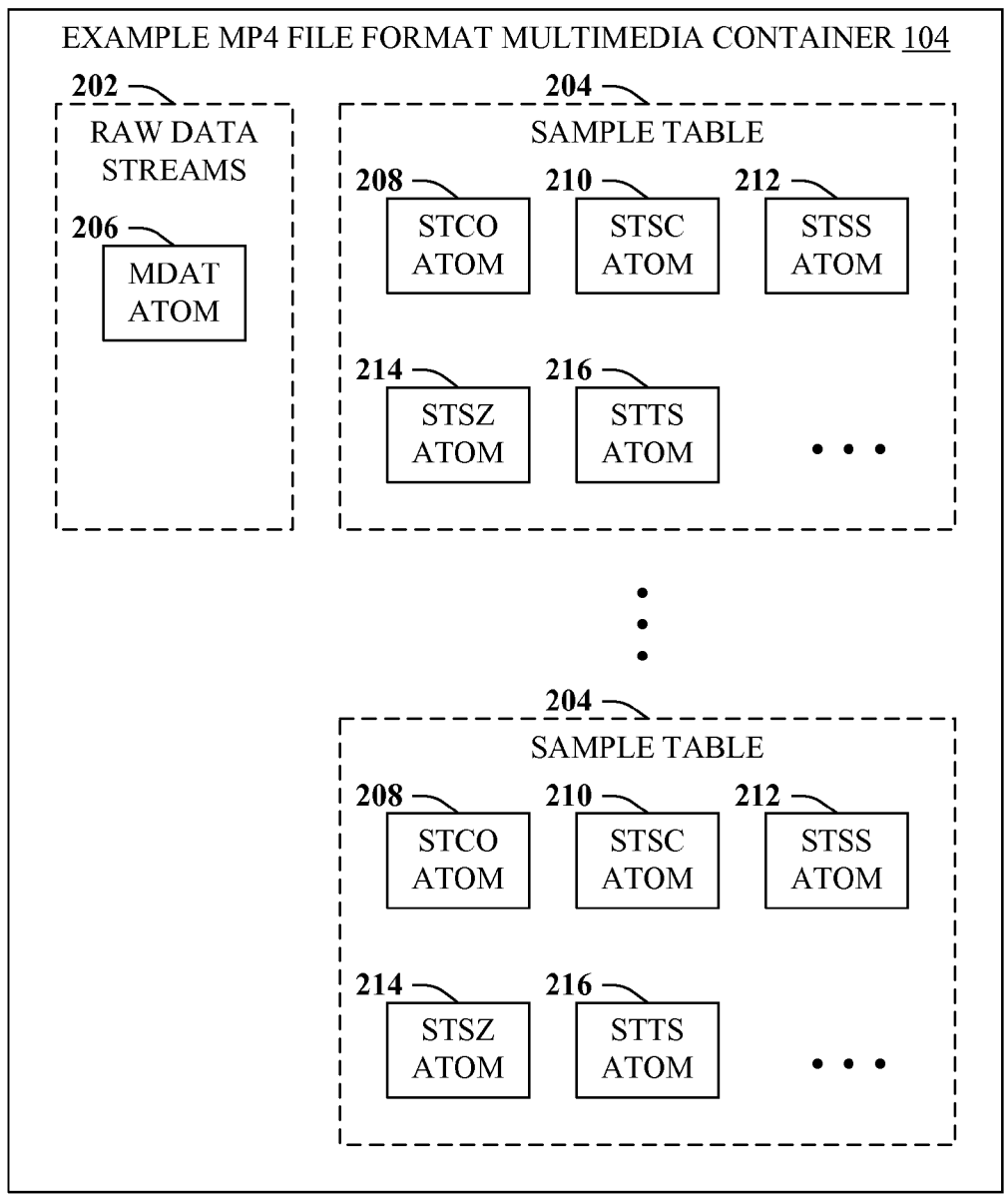
FIG. 2 depicts an example block diagram of an MP4 file format associated with a multimedia container.

While still referring to FIG. 1, but turning also to FIG. 2, diagram 200 illustrates an abstracted example MP4 file format associated with multimedia container 104. In general, the MP4 file format is organized in hierarchical units called atoms. However, as the hierarchical structure is not essential for understanding the disclosed subject matter, for simplicity the actual hierarchy is not illustrated. Rather, example multimedia container 104 is illustrated based upon two significant features: raw data streams 202 and sample tables 204. MP4 multimedia container 104 includes atoms, some of which are depicted in diagram 200. Each atom included in MP4 multimedia container 104 can provide for specific characteristics. For example, atoms can include content (e.g., data or metadata) as well as other atoms, or might include only one or the other. Moreover, atoms such as those included in sample tables 204 generally include a set of sample tables for audio and a similar set of sample tables for video and such sample tables can exist for each track. Sample tables 204 can include atoms of a particular type for each track of video and for each track of audio.

In FIG. 2, mdat atom 206 represents a media data container and does not typically include other atoms, but includes raw audio and video streams. As is the case with most multimedia file formats, the raw audio and video streams, in this case housed by mdat atom 206, typically represents the largest portion in terms of bytes of multimedia container 104.

In addition to mdat atom 206, multimedia container 104 can also include an array of sample table atoms. For example, sample tables 204 can include stco (sample table-chunk offset) atoms 208, which includes information pertaining to chunk offset and partial data-offset information. Sample tables 204 can include stsc (sample table-sample-to-chunk) atoms 210, which includes information relating to sample-to-chunk offsets and partial data-offset information. Sample tables 204 can include stss (sample table-sync sample) atoms 212, which includes information relating to a synchronization sample table in connection with random access points. Sample tables 204 can also include stsz (sample table-sample size) atoms 214, which can describe information associated with frame sample sizes, and stts (sample table-time-to-sample) atoms 216, which includes information relating to sample timestamps. Sample table atoms detailed herein may include sample table atoms 208-216 for various individual tracks of both audio and video.

Continuing the discussion of FIG. 1, system 100 can include timing component 108 that can be configured to receive target range 110 associated with media content 106 described by multimedia container 104. Target range 110 can include start time 112 and end time 114 for a target portion of media content 106. Thus, when editing a video to trim portions of the video, a user can identify the target portion and all other portions can be discarded. While further detailed infra, briefly, to identify start time 112 a first time can be selected (or no start time selection, in which case a default of the beginning of media content 106 can be used as start time 112) Likewise, to identify end time 114, a second time can be selected (or no end time selection, in which case a default of the end of media content 106 can be utilized for end time 114). Regardless, based upon one or more selections, target range 110 from start time 112 to end time 114 can be determined/received by timing component 108. Timing component 108 can determine/receive multiple target ranges 110, for example, one for audio tracks and one for video tracks.

System 100 can also include parsing component 116. Parsing component 116 can be configured to identify trim data 118. Trim data 118 can be data included in multimedia container 104 that is not included in sample range 120. Sample range 120 corresponds to target range 110, but whereas target range 110 is generally measured in units of time (e.g., milliseconds), sample range 120 can be based upon samples and/or frames associated with multimedia container 104. Thus, sample range 120 can be related to target range 110, and can be derived from target range 110, which is further detailed with reference to FIG. 3. Multiple sample ranges 120 can be derived from target range 110. For example, one sample range 120 can be derived from a target range 110 associated with video, and one sample range 120 can be derived from a target range 110 associated with audio.

In addition, system 100 can include cropping component 122 that can be configured to remove trim data 118 from multimedia container 104. By removing trim data 118 from multimedia container 104 (potentially along with other modifications detailed herein), cropping component 122 can provide cropped container 124 as a modified version of multimedia container 104. Cropped container 124 is also a multimedia container in MP4 file format, yet this result can be obtained without transcoding and/or decoding and re-encoding. Rather, the editing can apply directly to data included in multimedia container 104 rather than to a decoded data stream.

Figure 3:
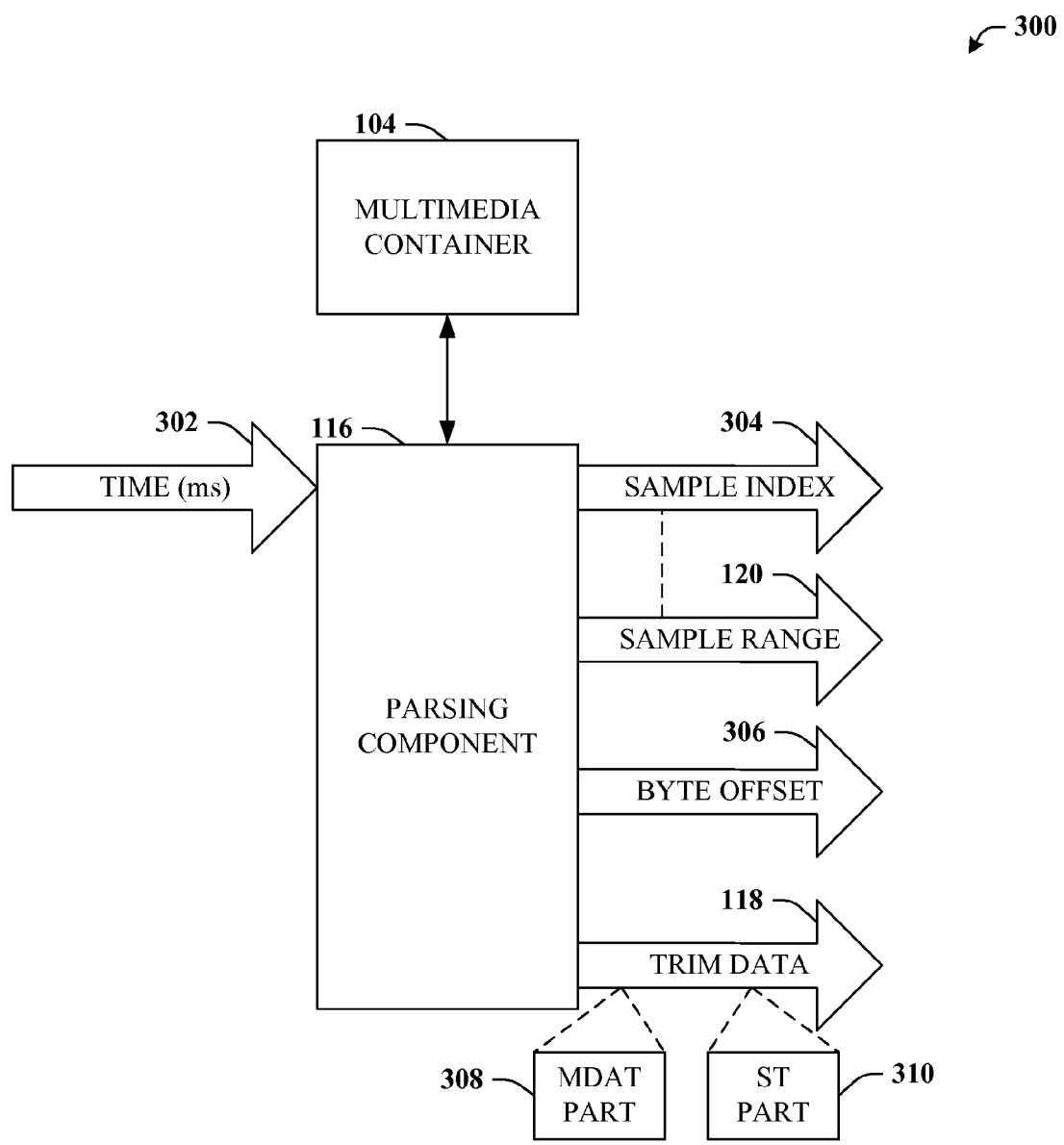
FIG. 3 illustrates a block diagram of a system that illustrates the parsing component of FIG. 1 in more detail in accordance with certain embodiments of this disclosure.

With reference now to FIG. 3, a system 300 is depicted. System 300 illustrates parsing component 116 in more detail. In one or more implementations, parsing component 116 can be configured to convert time 302 associated with target range 110 to sample index 304 associated with a timescale of multimedia container 104. Time 302 (e.g., received from timing component 108) will typically be associated with either start time 112 or end time 114, and will typically be formatted in terms of seconds or milliseconds. Thus, to find a corresponding sample from multimedia container 104, parsing component 116 can first convert time 302 into a format consistent with multimedia container 104, in this case sample index 304 that corresponds to time 302. Conversions of time 302 can be performed based upon audio tracks and/or video tracks. Multiple sample indices 304 and multiple sample ranges 120 can be constructed, e.g., one for audio and one for video.

In order to perform this conversion of time 302 to sample index 304, parsing component 116 can examine one or more of the sample tables included in multimedia container 104 such as those illustrated by sample tables 204 of FIG. 2. It is understood that sample index 304 can relate to both audio channels and video channels. For example, in one or more implementations, parsing component 116 can select sample index 304 from among entries in stss atoms 212. For example, parsing component 116 can select sample index 304 from among video channel I-frames described by stss atoms 212. In terms of video channels, I-frames include more information than other frame types (e.g., B-frames or P-frames), and do not require leveraging data in other frames. Therefore, video channels typically must begin with an I-frame. Hence, parsing component 116 can find a matching I-frame for sample index 304 particularly in cases where time 302 is start time 112, but such can also apply to cases where time 302 is end time 114. It is understood that although the constraint of matching an I-frame is not necessarily required for audio channels. Once a matching video I-frame for sample index 304 is determined, parsing component 116 can determine a nearest audio sample.

As discussed, parsing component 116 can identify trim data 118 included in multimedia container 104 that is not included in sample range 120, and further that sample range 120 corresponds to target range 110. Hence, parsing component 116 can construct sample range 120 (that corresponds to target range 110) based upon one or more sample indices 304 (that corresponds to one or more time 302 inputs, such as start time 112 and/or end time 114). Thus, upon receiving target range 110 (e.g., from timing component 108) parsing component 116 can construct sample range 120 based upon the conversions detailed supra. Once sample range 120 is constructed, parsing component 116 can identify trim data 118 as data included in multimedia container 104 that is outside sample range 120.

In one or more implementations, parsing component 116 can be further configured to calculate byte offset 306 for sample range 120. Byte offset 306 can be calculated based upon an examination of various atoms included in sample tables 204, e.g., stsc atoms 210, stco atoms 208, and stsz atoms 214.

It is understood that cropping component 122 can remove trim data 118 for both an audio channel and a video channel. It is further understood that in order to crop multimedia container 104 without transcoding, trim data 118 will generally include both portions from mdat atom 206 (e.g., mdat part 308) and portions from sample tables 204 (e.g., st part 310), both of which can be modified before cropped container 124 is edited. In one or more implementations, mdat part 308 (e.g., the portion of mdat atom 206 to be trimmed) can include raw multimedia stream data beyond a range defined by a start point and an end point. The start point can include a starting offset for audio and a starting offset for video. The endpoint can include (1) a sum of the end audio offset and the last audio sample size, and (2) a sum of the end video offset and the last video sample size. In one or more implementations, st part 310 (e.g., the portion trimmed from sample tables 204) can include samples from stsc atoms 210, stsz atoms 214, stts atoms 216, and stss atoms 212. St part 310 can also include stco atoms 208 chunks that are entirely outside sample range 120.

Figure 4:
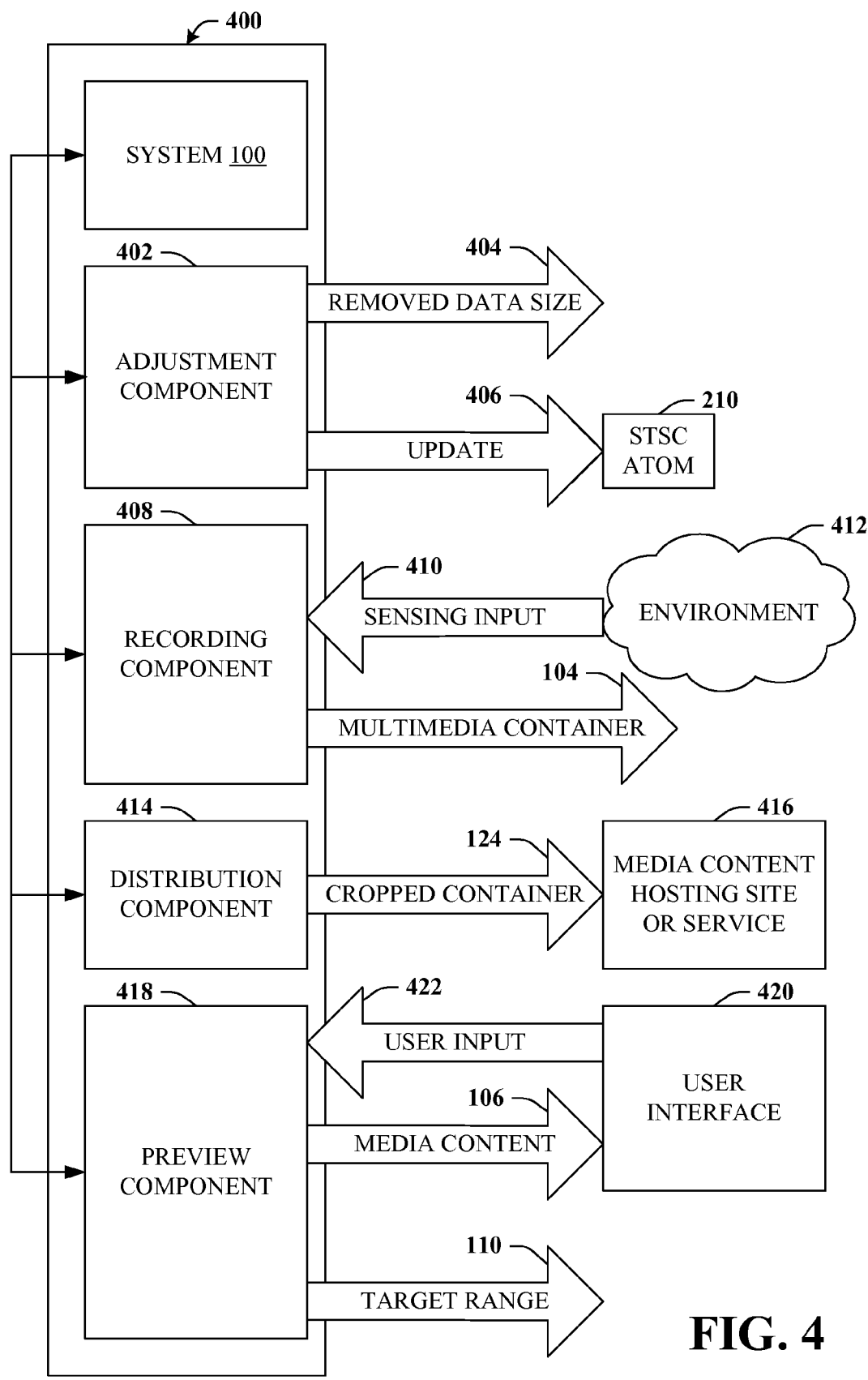
FIG. 4 illustrates a block diagram of a system that depicts additional features or aspects in connection with editing an MP4 multimedia container without transcoding in accordance with certain embodiments of this disclosure.

Turning now to FIG. 4, system 400 is illustrated. System 400 depicts additional features or aspects in connection with editing an MP4 multimedia container without transcoding. System 400 can include all or portions of system 100. In addition, system 400 can include one or more of the components 402, 408, 414, or 418, which are now described.

Adjustment component 402 can be configured to calculate removed data size 404 that describes an amount (e.g., byte size) of data that has been removed from mdat atom 206 (e.g., a size of mdat part 308). Adjustment component 402 can also be configured to employ removed data size 404 to update (via update 406) stsc atoms 210 in audio and video tracks. It is appreciated that stsc atoms 210 values can thus be adjusted to take into account the difference in the header size (if the headers are at the end) and the amount of data removed from the start of mdat atom 206.

Recording component 408 can be configured to record media content 106. Such can be accomplished by receiving sensing input (e.g., with a camera, microphone, etc.) from environment 412 (e.g., a physical location in proximity to recording component 408). Recording component 408 can package media content into multimedia container 104. Multimedia container 104 can then be received by container component 102 of system 100 in order to facilitate trimming or other editing.

Distribution component 414 can be configured to receive cropped container 124 (e.g., from system 100) and to upload cropped container 124 to a media content site or service 416, e.g., a video hosting website or a social networking site or service with video sharing capabilities.

Preview component 418 can be configured to present media content 106 to a user interface 420. A user utilizing user interface 420 can preview media content 106, for example, to determine which portions to remove (e.g., the first two minutes, the last 20.25 seconds, a 5 second range from the middle, etc.). Thus, preview component 418 can be further configured to mark at least one of start time 112 or end time 114 based upon input to user interface 420, which can be forwarded to preview component 418 (e.g., as user input 422). Based upon start time 112 and end time 114, target range 110 can be determined and provided to timing component 108. If only one timing data point is provided, then a beginning of the file or an end of the file can be employed as a default for the second data point in target range 110. For example, if start time 112 is provided, but end time 114 is not provided, then the end of media content 106 can be automatically selected as end time 114. If end time 114 is provided but start time 112 is not, then a beginning of media content 106 can be selected by default for start time 112.

It is appreciated that while preview component 418 can decode multimedia container 104 and recording component 408 can encode multimedia container 104, such are distinct from trimming or other editing provided by cropping component 122. For example, preview component 418 can decode multimedia container 104 in order to present media content 106 to user interface 420 or to an output device. Recording component 408 can encode multimedia container 104 (e.g., during original recording of media content 106), which can thereafter be edited by cropping component 122, where multimedia container 104 is edited rather than editing a media stream obtained by first decoding multimedia container 104. Cropping component 122 can edit portions of multimedia container 104 itself, and therefore can edit without decoding, encoding, and/or any transcoding being employed in conjunction with the editing. In contrast, previous systems or method edit an MP4 container by first decoding the container, performing edits on the media stream, and then re-encoding the edit media stream to a new MP4 container.

Figure 5:
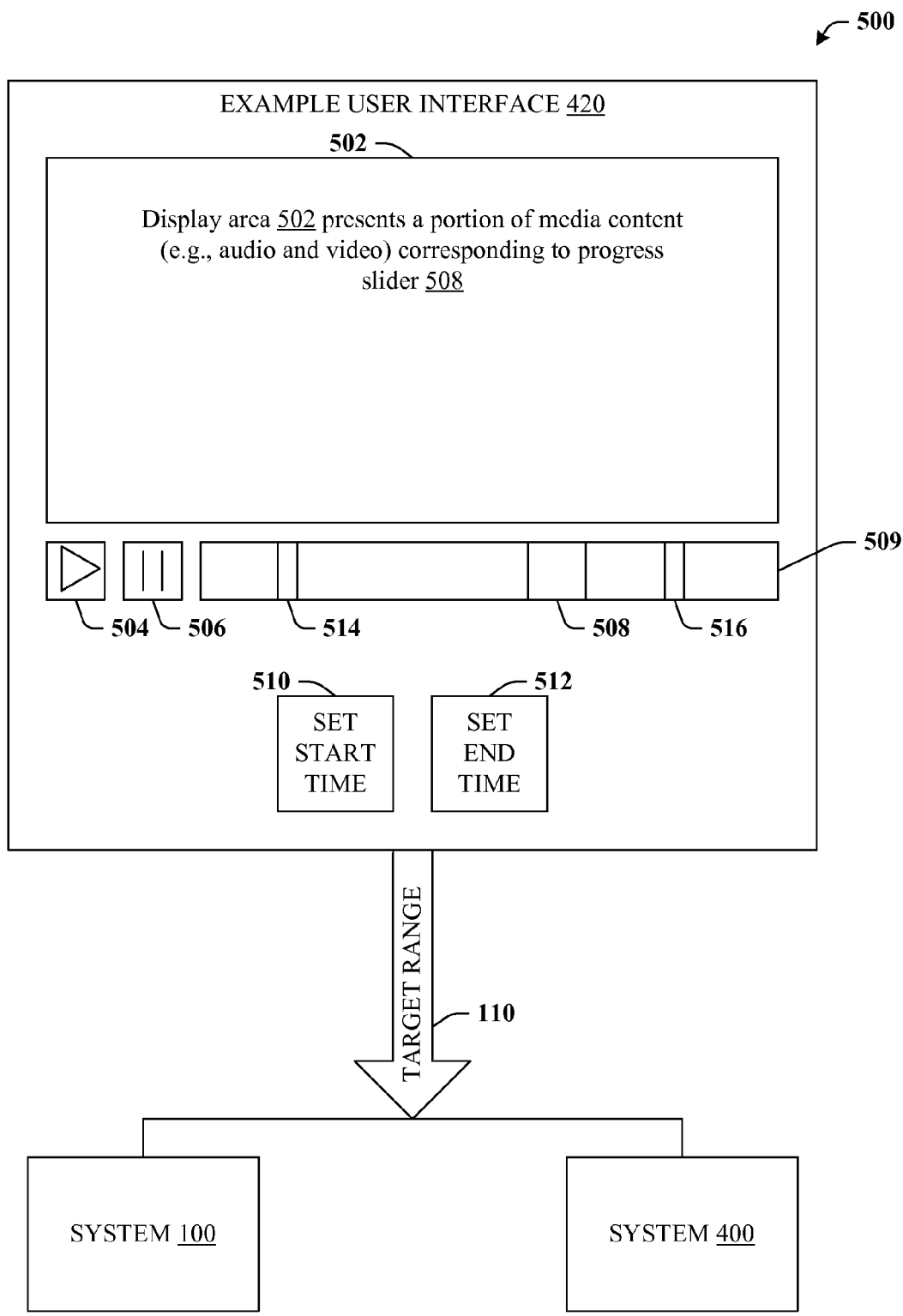
FIG. 5 illustrates a block diagram of an example user interface that can be employed to identify a target range in accordance with certain embodiments of this disclosure.

Referring now to FIG. 5, system 500 is depicted. System 500 depicts an example of a user interface that can be employed to identify target range 110. In FIG. 5, user interface 420 can include display area 502 that can present media content 106 (e.g., audio channels and video channels) corresponding to progress slider 508. User interface 420 can include interface objects such as play button 504 and pause button 506 to start/stop the progress of media content 106 tracked by progress slider 508. Progress slider 508 can be adjusted by dragging progress slider 508 forward or backward along progress bar 509, which can appropriately update display area 502. Progress slider 508 can also be adjusted using other suitable input means and display area 502 can be updated accordingly.

User interface 420 can also include interface elements that enable a user to mark one or more portions to be trimmed from media content 106, illustrated here as set start time button 510 and set end time button 512. For example, progress slider 508 can be dragged to a location identified by mark 514 (display area 502 will be updated accordingly) and set start time 510 button can be selected. Visual indicia can be provided at mark 514, e.g., as illustrated in FIG. 5. Similarly, progress slider 508 can be moved to a location identified by mark 516 and set end time button 512 can be selected. In this example, target range 110 can be set to begin at a time associated with mark 514 and end with a time associated with mark 516, which further detailed with reference to FIG. 6. Target range 110 can then be provided to system 100 and/or system 400 and utilized as detailed herein.

It is understood that if no start time is set, then target range 110 can begin at the beginning of the file and if no end time is set, then target range 110 can end at the end of the file. It is further understood that multiple start times and/or end times can be employed in which case multiple target ranges 110 can be provided to systems 100 and/or system 400. In this case, multiple sample ranges (derived from the multiple target ranges 110) can be stitched together, which can also be accomplished without transcoding. Of course other implementations are possible with example user interface 420 intended to serve as a non-limiting concrete example. For instance, rather than utilizing buttons to set start/end times (e.g., 510, 512), elements used to mark times on the progress bar can be drawn (e.g., drag-and-drop) from a pool of such start/stop elements.

Figure 6:
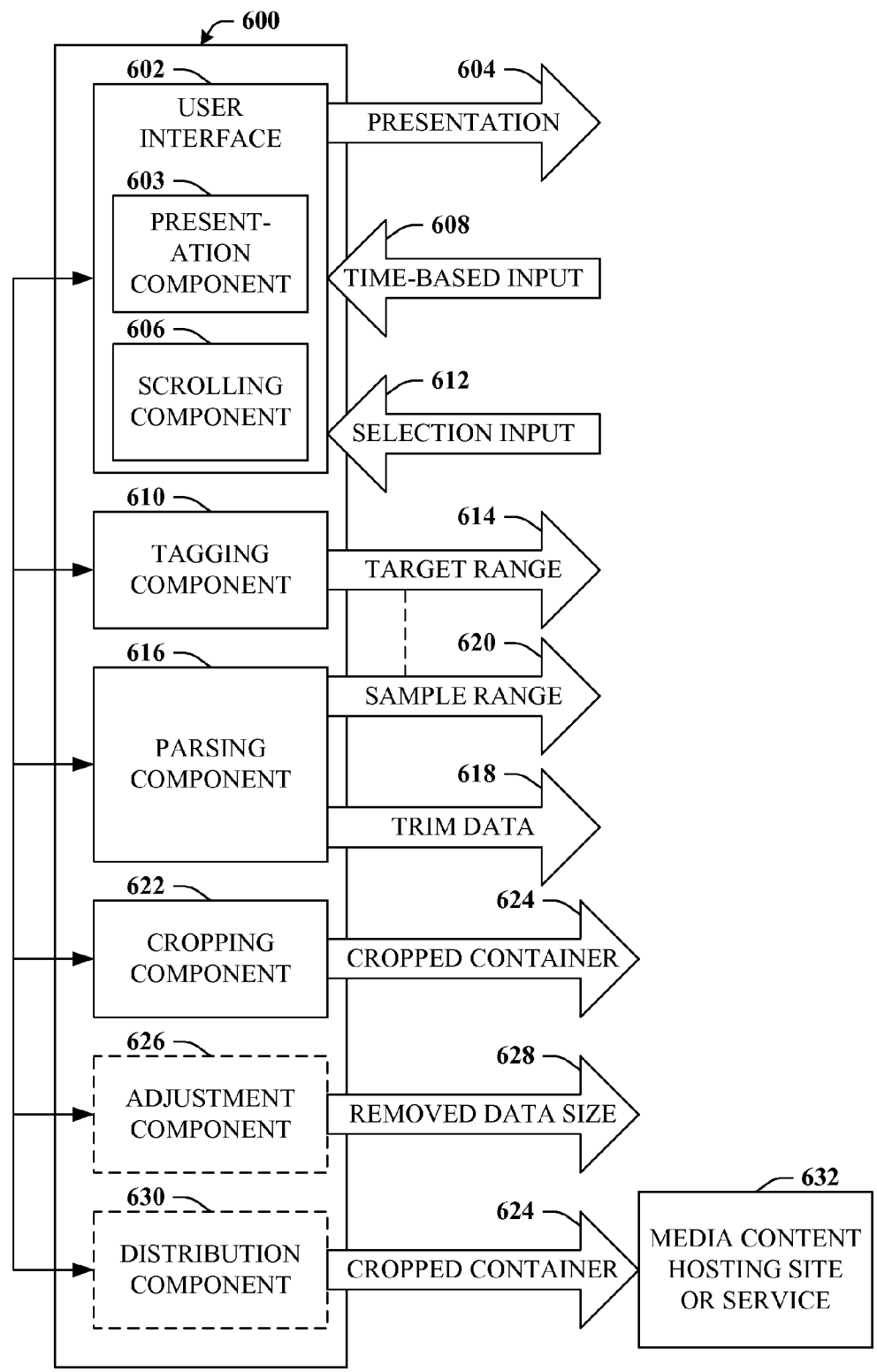
FIG. 6 illustrates a diagram of a system that can present media content in connection with editing the media content without transcoding in accordance with certain embodiments of this disclosure.

Referring to FIG. 6, system 600 is depicted. System 600 can present media content in connection with editing the media content without transcoding. System 600 can include user interface 602 that can be configured to present (e.g., via presentation 604) a portion of media content described by a multimedia container formatted according to MP4 file format. User interface 602 can be substantially similar to and/or can include features or aspects described in connection with user interface 420 detailed in connection with FIGS. 4 and 5.

System 600 can include scrolling component 606, all or a portion of which can be included in user interface 602. Scrolling component 606 can be configured to determine the portion of the media content that is presented in response to time-based input 608. For example, when a user employs user interface 602 to present the media content and further provides time-based input 608 (e.g., drags a progress slider or otherwise inputs a time), scrolling component 606 can determine the suitable portion of the media content that matches the time-based input 608. In response, presentation 604 can be updated accordingly.

System 600 can include tagging component 610, all or portions of which can also be included in user interface 602. Tagging component 610 can be configured to tag time-based input 608 as at least one of a start time or an end time in response to selection input 612. For example, the user can drag a progress slider to a desired location, then mark that location by way of selection input 612. Based upon one or more selection input 612, tagging component 610 can determine target range 614, which is the time-based range bounded by a start time and an end time.

System 600 can also include parsing component 616 that can be configured to identify trim data 618 included in the multimedia container that is not included in sample range 620 that corresponds to target range 614. Parsing component 616 can be substantially similar to and/or can include features or aspects described in connection with parsing component 116. For example, in one or more implementations, parsing component 616 can be further configured to convert a time associated with target range 614 to a sample index associated with a timescale of the multimedia container. In this manner sample range 620 can be derived from target range 614. Furthermore, trim data 618 determined by parsing component 616 can include an mdat atom portion and a sample tables portion. Thus, data removed from the multimedia container in order to accomplish trimming can be removed from both the raw audio/video data streams and the sample tables.

System 600 can include cropping component 622 that can be configured to remove trim data 618 from the multimedia container in order to provide cropped container 624. System 600 can also optionally include one or both of adjustment container 626 or distribution component 630. Adjustment component 626 can be configured to calculate removed data size 628 that is associated with an amount of data removed from the mdat atom portion of the multimedia container. Adjustment component 626 can be further configured to employ removed data size 628 to update at least one value for both audio and video tracks included in an stco atom of the multimedia container. Distribution component 630 can be configured to upload cropped container 624 to media content hosting site or service 632, e.g., a video hosting website or a social networking site with video sharing capabilities.

Figure 7:
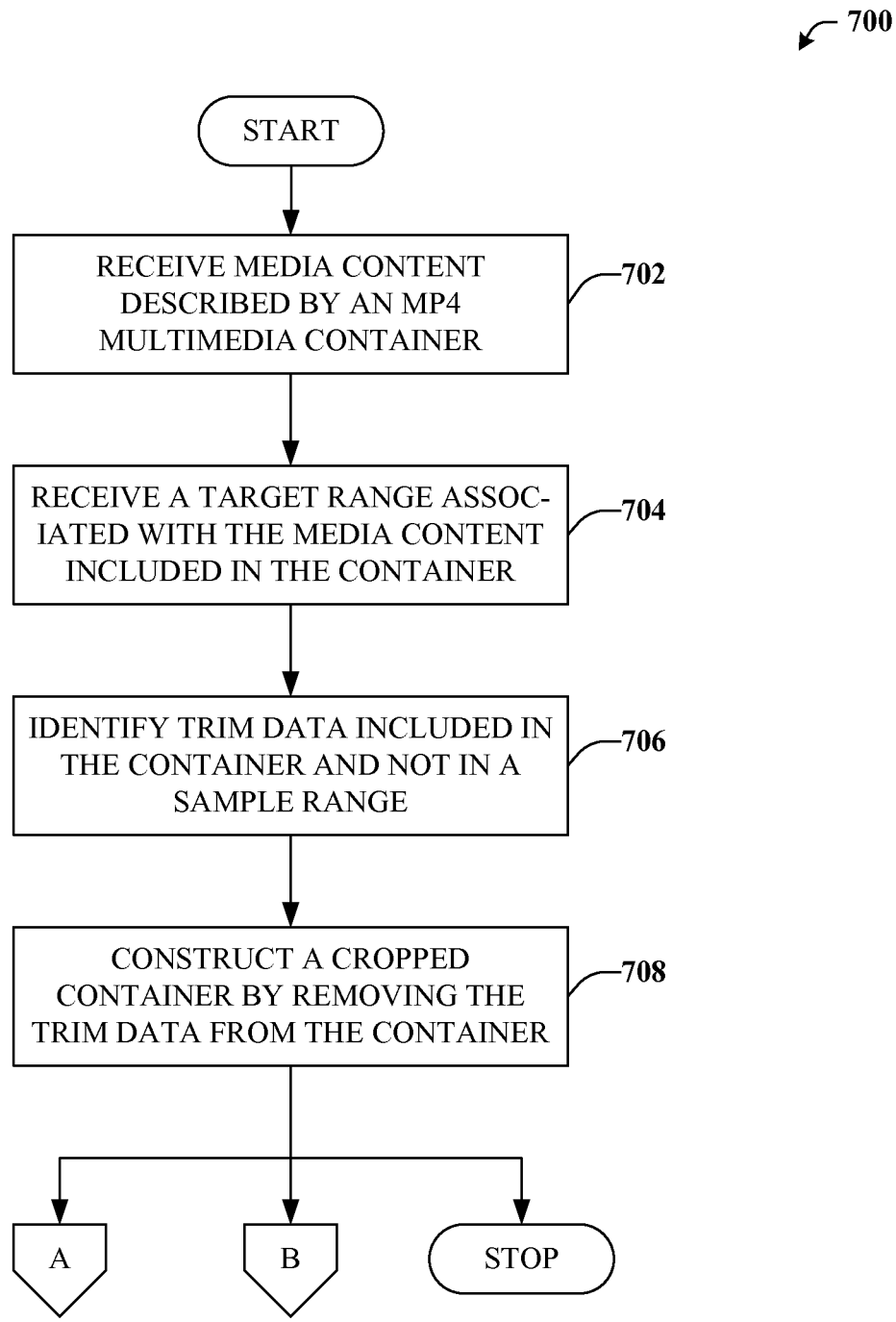
FIG. 7 illustrates an example methodology for trimming an MP4 multimedia container without transcoding in accordance with certain embodiments of this disclosure.
Figure 8:
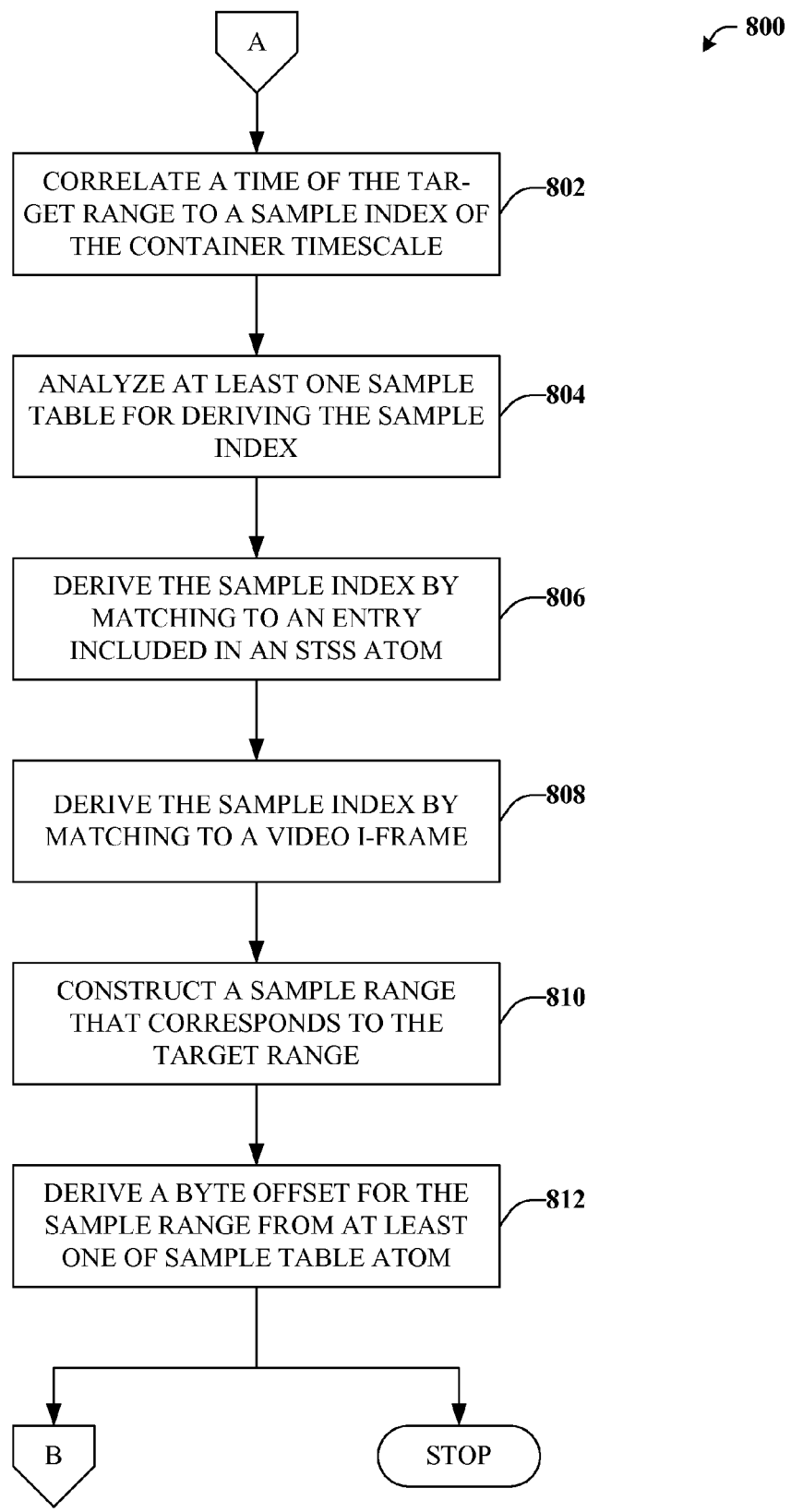
FIG. 8 illustrates an example methodology for providing various examples associated with deriving the sample range in accordance with certain embodiments of this disclosure.
Figure 9:
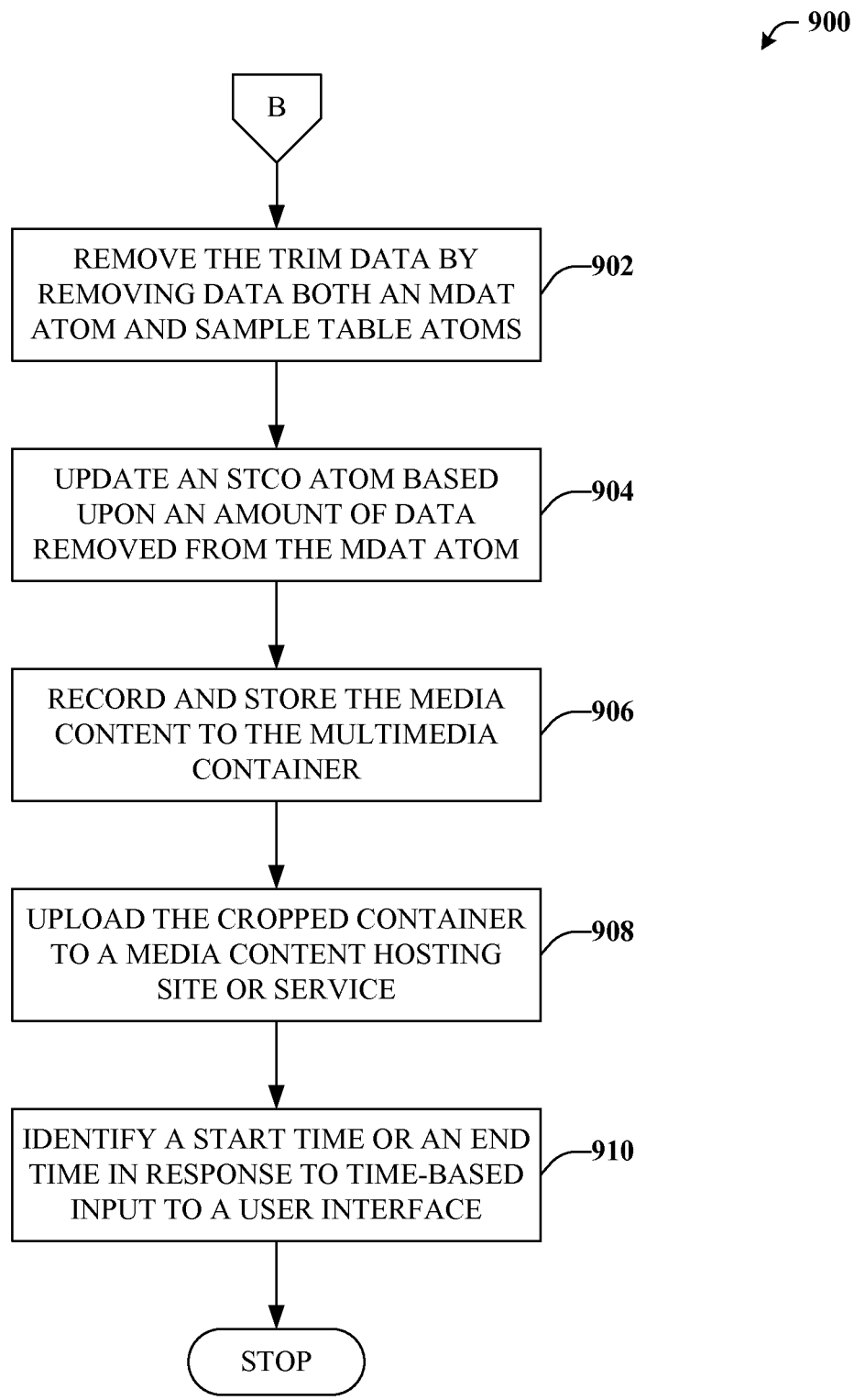
FIG. 9 illustrates an example methodology for providing additional features or aspects in connection with trimming an MP4 multimedia container without transcoding in accordance with certain embodiments of this disclosure.

FIGS. 7-9 illustrate various methodologies in accordance with certain embodiments of this disclosure. While, for purposes of simplicity of explanation, the methodologies are shown and described as a series of acts within the context of various flowcharts, it is to be understood and appreciated that embodiments of the disclosure are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be further appreciated that the methodologies disclosed hereinafter and throughout this disclosure are capable of being stored on an article of manufacture to facilitate transporting and transferring such methodologies to computers. The term article of manufacture, as used herein, is intended to encompass a computer program accessible from any computer-readable device or storage media.

Referring now to FIG. 7, exemplary method 700 for trimming an MP4 multimedia container without transcoding is depicted. Generally, at reference numeral 702, media content described by a multimedia container formatted according to the MP4 file format can be received (e.g., by a container component). At reference numeral 704, a target range associated with the media content described by the multimedia container can be received (e.g., by a timing component). This target range can include a start time and an end time for a target portion of the media content. The target portion can represent data to be maintained, while data outside the target portion can be slated for removal.

At reference numeral 706, trim data included in the multimedia container can be identified (e.g., by a parsing component). This trim data can represent data beyond the boundaries of a sample range that corresponds to the target range, and therefore targeted for removal. At reference numeral 708, a cropped container can be constructed (e.g., by a cropping component) by removing the trim data from the multimedia container.

Turning now to FIG. 8, example method 800 is illustrated. Method 800 provides various non-limiting examples associated with deriving the sample range. At reference numeral 802, a time associated with the target range can be converted to a sample index associated with a timescale of the multimedia container. At reference numeral 804, at least one sample table included in the multimedia container can be examined for deriving the sample index from the time associated with the target range. Conversions of the time can be performed based upon audio tracks and/or video tracks. Multiple sample indices can be constructed, e.g., one for audio and one for video.

Such can be accomplished in various ways. For example, at reference numeral 806, deriving the sample index or indices from the time associated with the target range can include matching the sample time(s) to entries included in an stss atom. For example, at reference numeral 808, deriving the sample index or indices from the time associated with the target range can include matching the sample index to a video frame sample associated with an I-frame. An associated audio frame can be selected that is nearest this video I-frame.

At reference numeral 810, sample range(s) that corresponds to the target range can be constructed based upon the sample index (or indices). At reference numeral 812, a byte offset for the sample range(s) can be derived from at least one of an stsc atom, and stco atom, or an stsz atom.

Referring to FIG. 9, example method 900 is depicted. Method 900 provides additional non-limiting features or aspects in connection with trimming an MP4 multimedia container without transcoding. At reference numeral 902, the removing trim data described in connection with reference numeral 708 of FIG. 7 can include removing data included in an mdat atom and data included in sample table atoms.

At reference numeral 904, an amount of data removed from the mdat atom can be determined and an stco atom can be updated based upon the amount of data removed from the mdat atom. At reference numeral 906, the media content can be recorded and stored (e.g., by a recording component) to the multimedia container (e.g., in MP4 file format). The multimedia container can thereafter be trimmed without decoding and/or re-encoding.

At reference numeral 908, the cropped container constructed at reference numeral 708 of FIG. 7 can be uploaded (e.g., by a distribution component) to a media content hosting site or service. At reference numeral 910, at least one of the start time or the end time can be identified based upon time-based input to a user interface that presents the media content.

In one embodiments, the time-based input to the user interface can represent portions of the media content that designated to be kept. In this case, the time-based input can serve as the bounds for the target range received at reference numeral 702 of FIG. 7. In other embodiments, the time-based input can represent portions of the media content designated to be cropped. In this case, the target range can be derived appropriately.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated herein.

Figure 10:
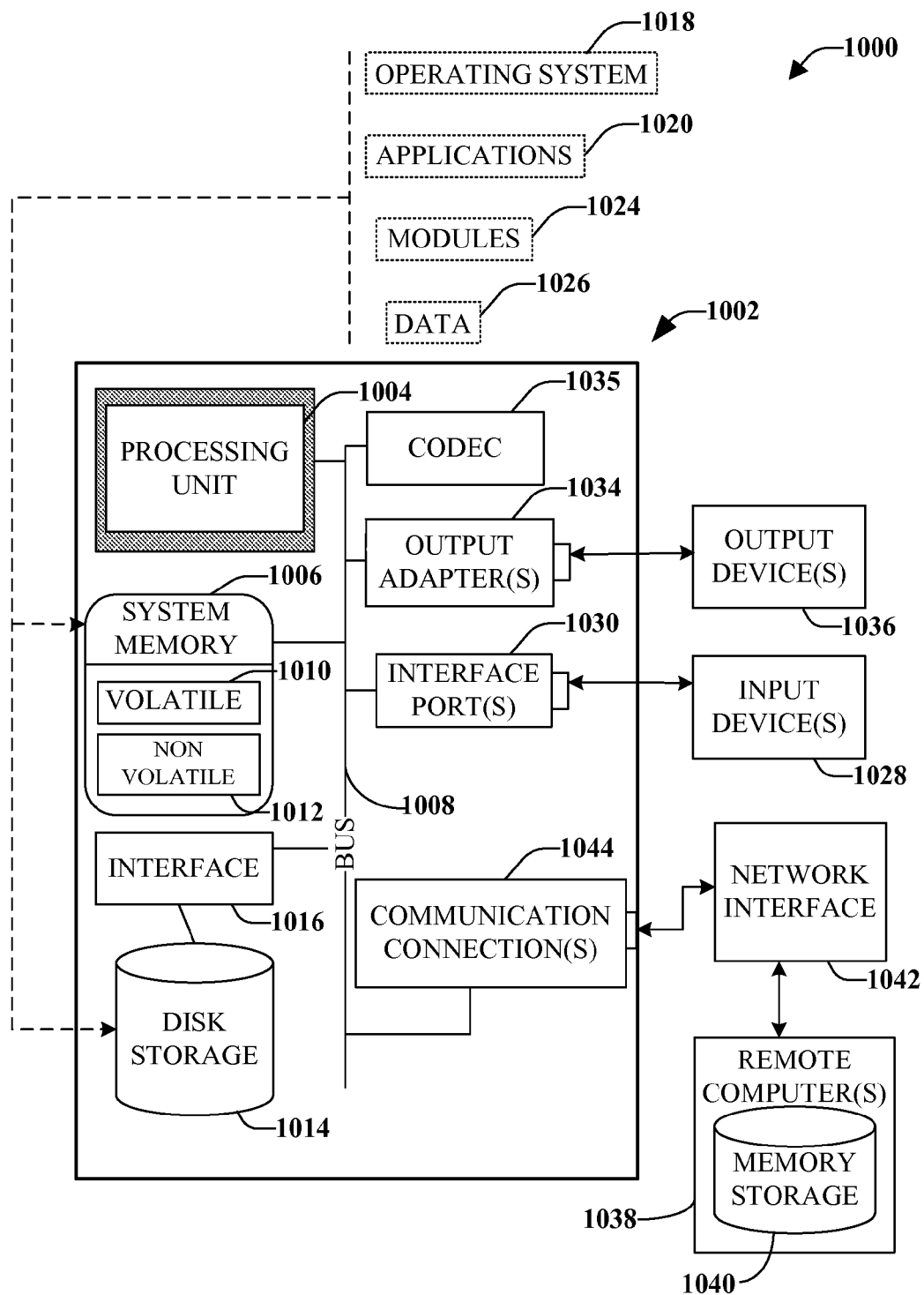
FIG. 10 illustrates an example schematic block diagram for a computing environment in accordance with certain embodiments of this disclosure.

With reference to FIG. 10, a suitable environment 1000 for implementing various aspects of the claimed subject matter includes a computer 1002. The computer 1002 includes a processing unit 1004, a system memory 1006, a codec 1035, and a system bus 1008. The system bus 1008 couples system components including, but not limited to, the system memory 1006 to the processing unit 1004. The processing unit 1004 can be any of various available processors. Dual microprocessors and other multiprocessor architectures also can be employed as the processing unit 1004.

The system bus 1008 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1006 includes volatile memory 1010 and non-volatile memory 1012. The basic input/output system (BIOS), containing the basic routines to transfer information between elements within the computer 1002, such as during start-up, is stored in non-volatile memory 1012. In addition, according to present innovations, codec 1035 may include at least one of an encoder or decoder, wherein the at least one of an encoder or decoder may consist of hardware, a combination of hardware and software, or software. For example, in one or more embodiments, all or portions of codec 1035 can be included in recording component 408 and/or preview component 418. Although, codec 1035 is depicted as a separate component, codec 1035 may be contained within non-volatile memory 1012. By way of illustration, and not limitation, non-volatile memory 1012 can include read only memory (ROM), programmable ROM (PROM), electrically programmable ROM (EPROM), electrically erasable programmable ROM (EEPROM), or flash memory. Volatile memory 1010 includes random access memory (RAM), which acts as external cache memory. According to present aspects, the volatile memory may store the write operation retry logic (not shown in FIG. 10) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1002 may also include removable/non-removable, volatile/non-volatile computer storage medium. FIG. 10 illustrates, for example, disk storage 1014. Disk storage 1014 includes, but is not limited to, devices like a magnetic disk drive, solid state disk (SSD) floppy disk drive, tape drive, Jaz drive, Zip drive, LS-100 drive, flash memory card, or memory stick. In addition, disk storage 1014 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used, such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer system 1002. Applications 1020 take advantage of the management of resources by operating system 1018 through program modules 1024, and program data 1026, such as the boot/shutdown transaction table and the like, stored either in system memory 1006 or on disk storage 1014. It is to be appreciated that the claimed subject matter can be implemented with various operating systems or combinations of operating systems.

A user enters commands or information into the computer 1002 through input device(s) 1028. Input devices 1028 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1004 through the system bus 1008 via interface port(s) 1030. Interface port(s) 1030 include, for example, a serial port, a parallel port, a game port, and a universal serial bus (USB). Output device(s) 1036 use some of the same type of ports as input device(s) 1028. Thus, for example, a USB port may be used to provide input to computer 1002 and to output information from computer 1002 to an output device 1036. Output adapter 1034 is provided to illustrate that there are some output devices 1036 like monitors, speakers, and printers, among other output devices 1036, which require special adapters. The output adapters 1034 include, by way of illustration and not limitation, video and sound cards that provide a means of connection between the output device 1036 and the system bus 1008. It should be noted that other devices and/or systems of devices provide both input and output capabilities such as remote computer(s) 1038.

Computer 1002 can operate in a networked environment using logical connections to one or more remote computers, such as remote computer(s) 1038. The remote computer(s) 1038 can be a personal computer, a server, a router, a network PC, a workstation, a microprocessor based appliance, a peer device, a smart phone, a tablet, or other network node, and typically includes many of the elements described relative to computer 1002. For purposes of brevity, only a memory storage device 1040 is illustrated with remote computer(s) 1038. Remote computer(s) 1038 is logically connected to computer 1002 through a network interface 1042 and then connected via communication connection(s)

1044. Network interface 1042 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1044 refers to the hardware/software employed to connect the network interface 1042 to the bus 1008. While communication connection 1044 is shown for illustrative clarity inside computer 1002, it can also be external to computer 1002. The hardware/software necessary for connection to the network interface 1042 includes, for exemplary purposes only, internal and external technologies such as, modems including regular telephone grade modems, cable modems and DSL modems, ISDN adapters, and wired and wireless Ethernet cards, hubs, and routers.

Figure 11:
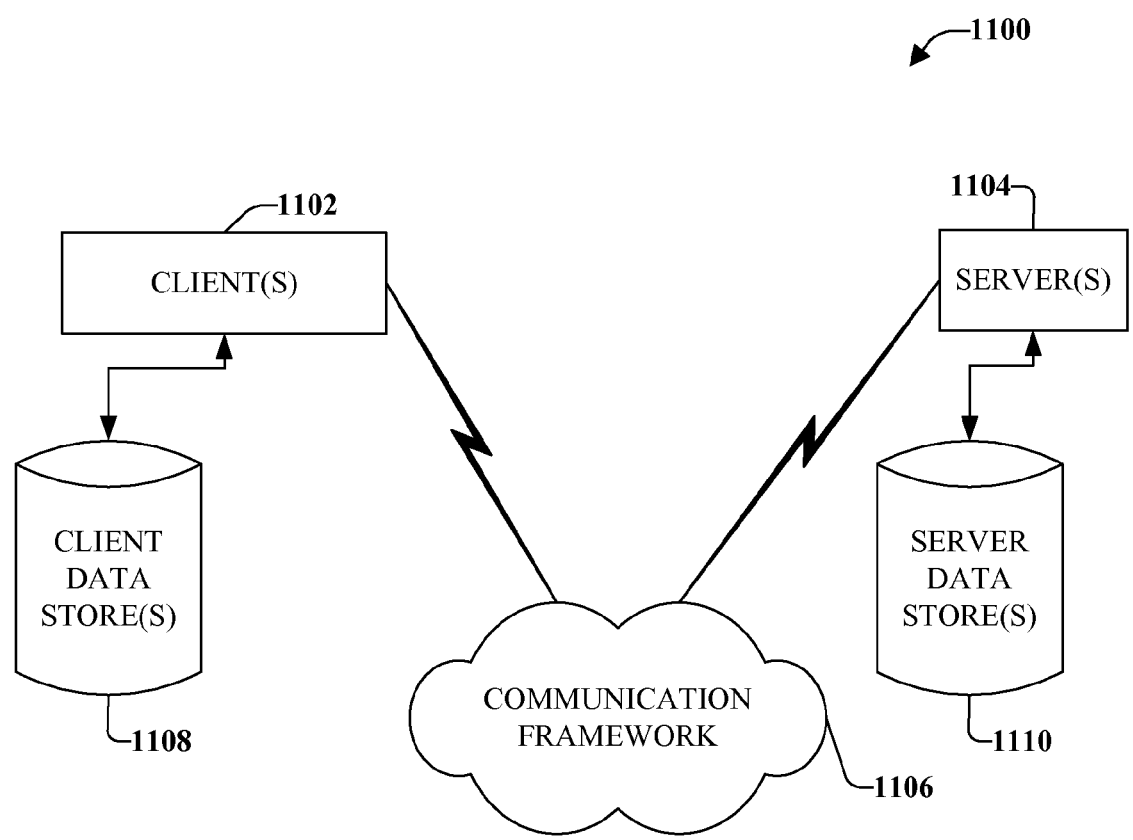
FIG. 11 illustrates an example block diagram of a computer operable to execute certain embodiments of this disclosure.

Referring now to FIG. 11, there is illustrated a schematic block diagram of a computing environment 1100 in accordance with this specification. The system 1100 includes one or more client(s) 1102 (e.g., laptops, smart phones, PDAs, media players, computers, portable electronic devices, tablets, and the like). The client(s) 1102 can be hardware and/or software (e.g., threads, processes, computing devices). The system 1100 also includes one or more server(s) 1104. The server(s) 1104 can also be hardware or hardware in combination with software (e.g., threads, processes, computing devices). The servers 1104 can house threads to perform transformations by employing aspects of this disclosure, for example. One possible communication between a client 1102 and a server 1104 can be in the form of a data packet transmitted between two or more computer processes wherein the data packet may include video data. The data packet can include a cookie and/or associated contextual information, for example. The system 1100 includes a communication framework 1106 (e.g., a global communication network such as the Internet, or mobile network(s)) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one or more embodiments, a client 1102 can transfer an encoded file, in accordance with the disclosed subject matter, to server 1104. Server 1104 can store the file, decode the file, or transmit the file to another client 1102. It is to be appreciated, that a client 1102 can also transfer uncompressed file to a server 1104 and server 1104 can compress the file in accordance with the disclosed subject matter. Likewise, server 1104 can encode video information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the present invention. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize. Moreover, use of the term "an embodiment" or "one embodiment" throughout is not intended to mean the same embodiment unless specifically described as such.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What is claimed is:

1. A system, comprising:
   a memory that stores computer executable components; and
   a microprocessor that executes the following computer executable components stored in the memory:
   a container component that receives an MP4 container that describes media content in an encoded MP4 file format; and
   an editing component that receives an instruction for a trimming operation that trims one or more portions of the media content outside a sample range of the media content without transcoding the MP4 container,
   wherein the editing component comprises:
      a timing component that receives a start time and an end time for a target range of the media content;
      a parsing component that:
         derives the sample range of the media content from the target range of the media data; and
         identifies trim data included in the MP4 container, the trim data corresponding to the media content not included in the derived sample range; and
      a cropping component that:
         removes the trim data from the MP4 container; and
         creates a modified container based on the removal of the trim data from the MP4 container.

2. The system of claim 1, wherein the editing component further receives an instruction for a stitching operation on the media content that is implemented without transcoding the MP4 container.

3. The system of claim 2, wherein the editing component further comprises a stitching component that receives the instruction for the stitching operation and appends a first target range of the media content to a second target range of the media content according to the instruction.

4. The system of claim 3, wherein the first target range of the media content and the second target range of the media content are included in the MP4 container.

5. The system of claim 3, wherein one of the first target range of the media content and the second target range of the media content is included in the MP4 container and another of the first target range of the media content and the second target range of the media content is included in another MP4 container.

6. The system of claim 5, wherein the MP4 container and the another MP4 container have identical or similar encoding characteristics.

7. The system of claim 1, wherein the editing component further receives an instruction for a rotation operation on the media content that is implemented without transcoding the MP4 container.

8. The system of claim 7, wherein the editing component further comprises a rotation component that receives the instruction for the rotation operation and implements the rotation operation according to the instruction.

9. An apparatus, comprising:
a processor; and
a memory communicatively coupled to the processor, the memory having stored therein computer-executable instructions, comprising:
a user interface, comprising:
a presentation component that presents a portion of media content described by a multimedia container formatted in an encoded MP4 file format, and
an input component that receives an instruction for a trimming operation that trims a portion of the media content outside a sample range of the media content without transcoding the multimedia container; and
an editing component wherein the editing component comprises:
a timing component that receives a start time and an end time for a target range of the media content;
a parsing component that:
derives the sample range of the media content from the target range of the media data; and
identifies trim data included in the multimedia container, the trim data corresponding to the media content not included in the sample range; and
a cropping component that:
removes the trim data from the multimedia container; and
creates the modified container based on the removal of the trim data from the multimedia container.

10. The apparatus of claim 9, further comprising a recording component that records the media content and constructs the multimedia container.

11. The apparatus of claim 9, further comprising a distribution component that uploads the modified container to a media content hosting site or service.

12. The apparatus of claim 9, wherein the user interface further comprises a scrolling component that determines the portion of the media content that is presented in response to a time-based input, and wherein the editing component further comprises a tagging component that tags the time-based input as at least one of a second start time or an second end time in response to a selection input, and that determines a second target range bounded by at least one of the second start time or the second end time, the second target range being used to identify trim data that is not included in the modified container.

13. The apparatus of claim 9, wherein the input component further receives an instruction for a stitching operation that is implemented without transcoding the multimedia container, and wherein the editing component further comprises a stitching component that appends a first target range of media content to a second target range of media content according to the instruction.

14. The apparatus of claim 12, wherein the input component further receives an instruction for a rotation operation that is implemented without transcoding the multimedia container, and wherein the editing component further comprises a rotation component that implements the rotation operation according to the instruction.

15. A method, comprising:
receiving, by a system including a processor, media content described by a multimedia container formatted in an encoded MP4 file format;
receiving, by the system, a target range associated with the media content described by the multimedia container, wherein the target range includes at least one of a start time and an end time for a target portion of the media content;
receiving, by the system, an instruction for a trimming operation that trims one or more portions of the media content outside a sample range of the media content without transcoding the MP4 container; and
creating, by the system in response to the instruction, a modified container formatted according to the MP4 file format from the multimedia container based on the trimming without transcoding the multimedia container, wherein the trimming comprises:
deriving the sample range of the media content from the target range associated with the media data;
identifying trim data included in the multimedia container, the trim data corresponding to the media content not included in the derived sample range; and
removing the trim data from the multimedia container; and
creating a modified container based on the removal of the trim data from the MP4 container.

16. The method of claim 15, further comprising creating, by the system, a modified container by stitching a first target range of the media content to a second target range of media content according to an instruction for a stitching operation on the media content that is implemented without transcoding the MP4 container.

* * * * *